Aug. 26, 1958 — G. F. HAUSMANN — 2,848,867

EJECTOR-SILENCER EXHAUST NOZZLE

Filed Dec. 24, 1956 — 2 Sheets-Sheet 1

INVENTOR
GEORGE F. HAUSMANN
BY
ATTORNEY

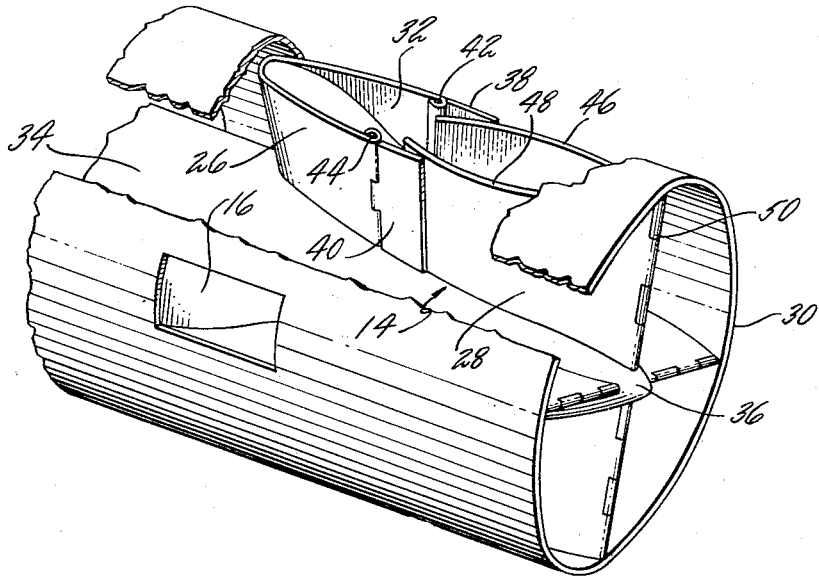

United States Patent Office 2,848,867
Patented Aug. 26, 1958

2,848,867

EJECTOR-SILENCER EXHAUST NOZZLE

George F. Hausmann, Glastonbury, Conn., assignor to United Aircraft Corporation, East Hartford, Conn., a corporation of Delaware Application December 24, 1956, Serial No. 630,326

6 Claims. (Cl. 60—35.6)

This invention relates to exhaust nozzles and more particularly to ejector type silencing means for exhaust nozzles.

It is an object of this invention to provide an exhaust nozzle arrangement for a jet powered aircraft which produces high thrust coefficients in all regimes of operation and yet provides noise suppression particularly at take off.

It is a further object of this invention to provide an exhaust nozzle of the type described including struts in the nozzle which have secondary air flowing thereover to provide high net thrust or low drag during non-afterburner operation. Furthermore, the entire arrangement provides a nozzle having a low drag external configuration.

These and other objects of this invention will become readily apparent from the following detailed description of the drawings in which:

Fig. 3 is a perspective illustration of the exhaust nozzle with some of the parts partially broken away;

Figure 1:
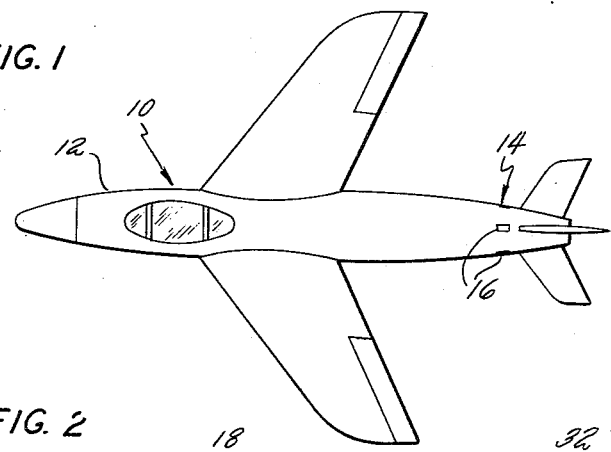
Fig. 1 is a schematic illustration of an aircraft having the nozzle of this invention.

Referring to Fig. 1, an aircraft is generally indicated at 10 as having a fuselage 12 which includes an exhaust nozzle section generally indicated at 14. The fuselage includes a plurality of openings 16 through which air is inducted into the exhaust nozzle for purposes to be described hereinafter.

Figure 2:
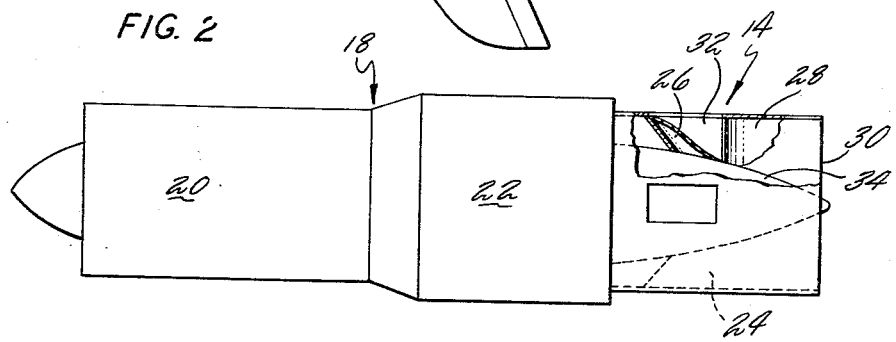
Fig. 2 is a partially cross-sectioned schematic of a jet power plant having the exhaust nozzle of this invention.

As seen in Fig. 2, the aircraft of Fig. 1 may have a turbojet power plant generally indicated at 18 as having a compressor 20 and a turbine and compressor section 22. The exhaust gases may then pass to an afterburner (not shown) from which the exhaust gases are in turn conducted to the exhaust nozzle 14. The exhaust nozzle 14 comprises a plurality of struts 24 which comprise forward or upstream portions 26 and aft or downstream portions 28. Four struts are shown for convenience of illustration but more may be utilized if desired. The exhaust gases from the power plant are eventually emitted by an aft opening 30. The upstream strut portion 26 includes a passage 32 which is intended to lead from the opening 16 in the fuselage skin and conducts air from outside of the aircraft internally of the exhaust nozzle.

As better seen in Fig. 3, the opening 16 in the outer casing or fuselage leads internally of the upstream strut portion 26 into the passage 32. As seen in Fig. 3 the struts 14 radiate outwardly from an inner body 34 which terminates in a downstream tail cone 36 adjacent the aft opening 30. The upstream or forward portion 26 of the struts 14 comprises a leading edge section and includes upper and lower surfaces which terminate at the trailing edge thereof in a pair of flaps 38 and 40. These flaps are pivotable about hinge lines 42 and 44 respectively, which run spanwise of the struts. The aft portion 28 of the struts 14 comprises two major surfaces 46 and 48 which are pivoted at their trailing edge on a spanwise hinge line 50 so that the forward edges of the major surfaces 46 and 48 can be moved toward or away from each other if desired so that they cooperate with the flaps 38 and 40 on the upstream strut portion 26.

Figure 4:
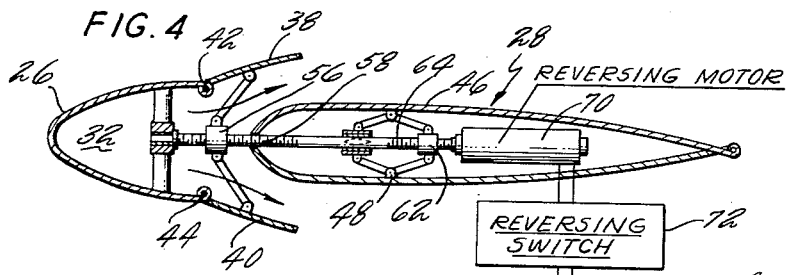
Fig. 4 is a cross-sectional enlargement of one of the exhaust nozzle struts in one of its operative positions.

As better seen in Fig. 4 the upstream or forward section 26 of the strut has the flaps 38 and 40 thereof connected to a nut 56, which is driven by a jack screw 58. In the position shown the flaps 38 and 40 are moved outwardly so that air inducted into the passage 32 leading from outside of the power plant is conducted over the major surfaces 46 and 48 of the aft section 28 of the strut. In this position the drive nut 62 has moved to the right along the jack screw 64 so that the major surfaces 46 and 48 of the aft part of the strut have been moved together. In this position of the parts, air inducted from outside of the exhaust nozzle is conducted into the upstream portion 26 via the passage 32 and then is ejected over the major surfaces 46 and 48 of the aft section of the strut. This not only reduces the drag created by the blockage of the flaps but also intermingles the induced air with the minimum flow through the exhaust nozzle so as to substantially reduce noise.

Figure 5:
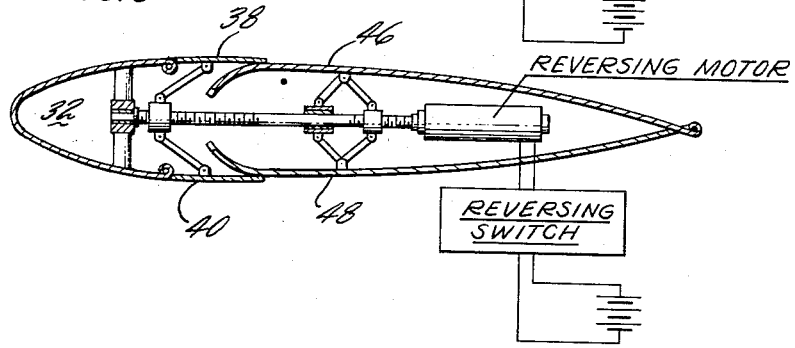
Fig. 5 is similar to Fig. 4 with the parts in another operative position.

The jack screws 58 and 64 may be rotated in a reverse manner by a suitable reversing motor 70 which is controlled by a reversing switch 72 from a suitable battery source 74. As seen in Fig. 5, the flaps 38 and 40 have been moved toward a closed position and the major surfaces 46 and 48 of the aft or downstream section of the strut have been moved apart so that they are in juxtaposed relation with the flaps 38 and 40. In this position of the elements, the struts present a minimum drag to the oncoming main stream. At the same time they present a smaller blockage to the stream so that afterburning can take place in the power plant. In other words, the area of the exhaust nozzle in this position of the parts has been increased to provide for the greater mass flow during afterburner operation. In this position also the struts define therebetween ordinary convergent-divergent passages to provide the high velocity flow.

As a result of this invention it is apparent that a highly efficient ejector-silencer exhaust nozzle has been provided. Thus the flow in the exhaust nozzle and net thrust is augmented by the air inducted from outside the power plant and into the main nozzle. Thus, during take-off and cruise operation with the elements in the position shown in Fig. 4, convergent area distribution is provided and the secondary air inducted from externally of the nozzle aids in reducing drag and noise. Furthermore, the air so inducted aids in cooling the struts to prevent overheating. For afterburner operation a convergent-divergent type of passage is provided with the parts in the position shown in Fig. 5.

Although only one embodiment of this invention has been illustrated and described herein, it will be apparent that various changes and modifications may be made in the construction and arrangement of the various parts without departing from the scope of this novel concept.

What it is desired by Letters Patent is:

1. A jet exhaust nozzle comprising a duct, a plurality of streamlined struts in said duct and extending transversely thereof, said struts comprising upstream and downstream portions, said upstream portion comprising a leading edge portion having first oppositely disposed surfaces terminating in trailing edge flaps, said downstream portion comprising an airfoil having second oppositely disposed major surfaces including a trailing edge hinge whereby said oppositely disposed surfaces can be moved apart about said hinge, said second oppositely disposed surfaces having leading edges located adjacent to and cooperating with said flaps, means for opening and closing said flaps and moving said second oppositely disposed surfaces and means for supplying air into said upstream portion for flow over said downstream portion.

2. A jet exhaust nozzle comprising a duct, a plurality of streamlined struts in said duct and extending transversely thereof, said struts comprising upstream and downstream portions, said upstream portion comprising a leading edge portion having first oppositely disposed surfaces terminating in trailing edge flaps, said downstream portion comprising an airfoil having second oppositely disposed major surfaces including a trailing edge hinge whereby said oppositely disposed surfaces can be moved apart about said hinge, said second oppositely disposed surfaces having leading edges located adjacent to and cooperating with said flaps, means for simultaneously closing said flaps and moving said second oppositely disposed surfaces apart including a reversible motor, and means for supplying air internally of at least a portion of said struts.

3. A jet exhaust nozzle comprising a duct, a plurality of streamlined struts in said duct and extending transversely thereof, said struts comprising upstream and downstream portions, each of said upstream portions comprising a leading edge portion having first oppositely disposed major surfaces terminating in trailing edge flaps, said downstream portion comprising an airfoil having second oppositely disposed major surfaces including a trailing edge hinge whereby said oppositely disposed surfaces can be moved apart about said hinge, said second oppositely disposed surfaces having leading edges cooperating with and located within said flaps, openings in the wall of said duct, passages in said upstream portions communicating with said openings, and means for opening and closing said flaps and moving said second oppositely disposed surfaces whereby flow is regulated from said openings through said passages, past said flaps and over the outer surfaces of said second major surfaces.

4. A jet exhaust nozzle comprising a duct including openings in the wall thereof, a plurality of streamlined struts in said duct and extending transversely thereof, said struts comprising upstream and downstream portions, said upstream portion including passages communicating with said openings whereby to induct air into said struts for ejection into said duct and comprising a leading edge portion having first oppositely disposed surfaces terminating in trailing edge flaps, said downstream portion comprising an airfoil having second oppositely disposed major surfaces including a trailing edge hinge whereby said surfaces can be moved apart about oppositely disposed surfaces can be moved apart about said hinge, said second oppositely disposed surfaces having leading edges located adjacent to and cooperating with said flaps, and means for simultaneously opening said flaps and moving said second oppositely disposed surfaces toward each other, and for simultaneously closing said flaps and moving said second surfaces apart whereby said flaps and second surfaces are in juxtaposed relation.

5. An exhaust nozzle for a jet power plant including a duct having an outer wall, streamlined struts extending radially from the longitudinal axis of said duct to said wall thereby forming passages therebetween, each of said struts comprising upstream and downstream portions, said upstream portion being hollow and comprising an airfoil leading edge portion and being open at its aft end, said downstream portion comprising an airfoil shaped member and having a leading edge located adjacent the opening in the aft end of said upstream portion, said upstream portion having trailing edge flaps and means for moving said flaps outwardly thereby forming a converging passage, said flaps in the outward position forming the throat of said nozzle, and means for supplying fluid to the inside of said hollow upstream portion.

6. An exhaust nozzle for a jet power plant including a duct having a wall, an inner body centrally located in said duct and cooperating with said wall to form an annular passage, streamlined struts extending radially from said inner body to said wall thereby normally forming convergent-divergent passages therebetween, each of said struts comprising upstream and downstream portions, said upstream portion comprising an airfoil leading edge and being open at its aft end, said downstream portion comprising an airfoil shaped member and having a leading edge located adjacent the opening in the aft end of said upstream portion, said upstream portion being hollow, openings in the wall of said duct in registry with said upstream portion, means for inducting air from said openings into the hollow of said upstream portion, means for ejecting said air over said aft portion for mixture with the flow between said struts including spanwise flaps carried by the trailing edge of said upstream portion, and means for moving said flaps.

References Cited in the file of this patent

UNITED STATES PATENTS

| | | |
|---|---|---|
| 2,483,401 | Cole | Oct. 4, 1949 |

FOREIGN PATENTS

| | | |
|---|---|---|
| 995,748 | France | July 22, 1951 |
| 731,343 | Great Britain | June 8, 1955 |
| 733,727 | Great Britain | July 20, 1955 |